US011177051B2

(12) United States Patent
Klimke et al.

(10) Patent No.: US 11,177,051 B2
(45) Date of Patent: Nov. 16, 2021

(54) INSULATION LAYER FOR CABLES

(71) Applicant: Borealis AG, Vienna (AT)

(72) Inventors: Katja Klimke, Abu Dhabi (AE); Markus Gahleitner, Neuhofen/Krems (AT); Davide Tranchida, Linz (AT); Albrecht Dix, Notodden (NO); James Elliott Robinson, Genval (BE); Ann Watson, Arbroath (GB); Audrey Frenot Johansson, Hoviksnas (SE)

(73) Assignee: BOREALIS AG, Vienna (AT)

( * ) Notice: Subject to any disclaimer, the term of this patent is extended or adjusted under 35 U.S.C. 154(b) by 184 days.

(21) Appl. No.: 14/782,576

(22) PCT Filed: Apr. 2, 2014

(86) PCT No.: PCT/EP2014/056570
§ 371 (c)(1),
(2) Date: Oct. 5, 2015

(87) PCT Pub. No.: WO2014/170128
PCT Pub. Date: Oct. 23, 2014

(65) Prior Publication Data
US 2016/0071628 A1 Mar. 10, 2016

(30) Foreign Application Priority Data
Apr. 16, 2013 (EP) .................................... 13163931

(51) Int. Cl.
H01B 3/44 (2006.01)
H01B 19/04 (2006.01)
C08L 23/14 (2006.01)

(52) U.S. Cl.
CPC .............. *H01B 3/441* (2013.01); *C08L 23/14* (2013.01); *H01B 19/04* (2013.01); *C08L 2203/202* (2013.01)

(58) Field of Classification Search
CPC .................................. C08L 23/08; B29C 47/28
USPC .................. 264/172.19, 264.01; 174/110 SR
See application file for complete search history.

(56) References Cited

U.S. PATENT DOCUMENTS

| 4,506,056 A | 3/1985 | Gaylord | |
|---|---|---|---|
| 4,753,991 A | 6/1988 | Bronstert | |
| 4,753,997 A * | 6/1988 | Shyu | C08F 255/00 525/259 |
| 2003/0092816 A1* | 5/2003 | Mehta | C08K 9/04 524/445 |
| 2004/0158000 A1* | 8/2004 | Yada | C08L 23/10 525/240 |
| 2004/0242716 A1* | 12/2004 | Motha | C08J 9/0061 521/142 |
| 2005/0241820 A1* | 11/2005 | Wasserman | G02B 6/4429 166/100 |
| 2007/0004860 A1* | 1/2007 | Leboeuf | B32B 27/08 525/70 |
| 2007/0251572 A1* | 11/2007 | Hoya | C08L 23/0815 136/256 |
| 2009/0018267 A1* | 1/2009 | Vestberg | C08F 110/06 525/52 |
| 2010/0285253 A1* | 11/2010 | Hughes | C08F 10/00 428/36.9 |
| 2011/0266027 A1* | 11/2011 | Pham | C08L 23/08 174/113 R |
| 2012/0217037 A1* | 8/2012 | Nakashima | B29C 47/28 174/110 SR |

FOREIGN PATENT DOCUMENTS

| EP | 0491566 B1 | 10/1996 |
|---|---|---|
| EP | 0893801 B1 | 4/2004 |
| EP | 0887379 B1 | 12/2004 |
| EP | 1183307 B1 | 7/2005 |
| EP | 2202271 A1 | 6/2010 |
| EP | 1619217 B1 | 9/2010 |
| EP | 1805238 B1 | 5/2011 |
| KR | 20050112145 A * | 11/2005 |
| WO | 8707620 A1 | 12/1987 |
| WO | 9212182 A1 | 7/1992 |
| WO | 9219653 A1 | 11/1992 |
| WO | 9219658 A1 | 11/1992 |
| WO | 9924478 A1 | 5/1999 |
| WO | 9924479 A1 | 5/1999 |
| WO | 0068315 A1 | 11/2000 |
| WO | 2004000899 A1 | 12/2003 |
| WO | 2004111095 A1 | 5/2004 |
| WO | 2010076231 A1 | 7/2010 |

OTHER PUBLICATIONS

KR 20050112145 A English Machine Translation, Nov. 2005*
Stangland, Eric, E., et al., "Fundamental Characterization of Polypropylene Extrusion", The Dow Chemical Company, Midland, NJ.
Sherpard, Thomas A., et al., "Self Organization and Polyolefin Nucleation Efficacy of 1,3:2,4-Di-p-Methylbenzylidene Sorbitol", Journal of Polymer Science: Part B: Polymer Physics, vol. 35, 2617-2628 (1997).
Balzano, Luigi, et al., "Thermoreversible DMDBS Phase Separation in iPP: The Effects of Flow on the Morphology", Macromolecules 2008, 41, 5350-5355.

(Continued)

*Primary Examiner* — Jennifer A Boyd
*Assistant Examiner* — Ricardo E Lopez
(74) *Attorney, Agent, or Firm* — Tarolli, Sundheim, Covell & Tummino LLP

(57) ABSTRACT

The present invention is directed to a new cable having at least one insulation layer, to a process for producing such cable as well as to the use of a polymeric-nucleating agent for increasing the crystallization temperature of a polymer composition being part of an insulation layer of such a cable and the use of such a cable as communication cable and/or electrical cable.

14 Claims, No Drawings

(56) References Cited

OTHER PUBLICATIONS

Kristiansen, Magnus, et al., "Mechanical Properties of Sorbitol-Clarified Isotactic Polypropylene: Influence of Additive Concentration on Polymer Structure and Yield Behavior", Macromolecules 2005, 38, 10461-10465.

Lipp, Jonathan, et al., "Fibril Formation of 1,3:2,4-Di(3,4-dimethylbenzylidene) Sorbitol in a Polypropylene Melt", Langmuir 2006, 22, 6398-6402.

Kissinger, Homer, E., et al., "Variation of Peak Temperature With Heating Rate In Differential Thermal Analysis", Journal of Research of the National Bureau of Standards vol. 57, No. 4, Oct. 1956.

Hayashi, Tetsuo, et al., "Heptad configurational analysis of 13C n.m.r. spectra in highly isotactic polypropylene", Polymer, 1988, vol. 29, January.

Chujo, Riichiro, et al., "Two-site model analysis of 13C n.m.r, of polypropylene polymerized by Ziegler-Natta catalyst with external alkoxysilane donors", Polymer, 1994, vol. 35, No. 2.

Baker, et al., "Confirmation of Ethylene/Propylene Copolymers (Random or Block) as Seen by 13C NMR, IR and Thermal Methods", Thermochimica Acta, 166 (1990), pp. 53-68.

Kromidas, et al., "Validierung in der Ankalytik", Wiley-VCH, 1999, ISBN 3-527-28748-5.

Vorwort, "Spektroskopie fuer Anwender", Wiley-VCH, 1997. ISBN 3-527-28749-3.

* cited by examiner

INSULATION LAYER FOR CABLES

The present invention is directed to a new cable having at least one insulation layer, to a process for producing such cable as well as to the use of a polymeric α-nucleating agent (pNA) for increasing the crystallization temperature of a polymer composition (PC) being part of an insulation layer of a cable and the use of such a cable as communication cable and/or electrical cable.

Today, polyethylene is used as the material of choice for insulative and semiconductive layers in cables due to the ease of processing and the beneficial electrical properties. For power cables the polymers, preferably low density polyethylene, are crosslinked in order to assure good operating properties at the required operating temperature (90° C.). A drawback of such crosslinked polyethylene materials is the remaining crystalline fraction of the polyethylene which melts at about 110° C. This means that at the emergency temperature (~135° C.) the material might create some problems. Another drawback is the lack of recyclability of such crosslinked insulation materials. For communication cables high density polyethylene is used in non-crosslinked form, again limiting the heat resistance but also the twistability because of the limited stiffness of this material.

Nowadays attempts are undertaken to replace known cable layers based on polyethylene by cable layers based on polypropylene offering advantages in both heat resistance and stiffness. Various polypropylene types have been suggested tailored for individual purposes.

For instance EP 1 619 217 A1 provides a cable layer of a heterophasic propylene polymer with good results with regard to softness and toughness, even though the toughness at low temperatures could be still improved. However, the polymer cannot be extruded at high line speeds. High line speeds, however, are highly appreciated from a commercial point of view.

EP 0 893 801 A1 discloses propylene polymer components suitable as insulation sheet material. It particularly discloses a polymer composition (PC) of a crystalline propylene homopolymer or copolymer mixed with a copolymer of ethylene with an α-olefin having a low density and a high structural uniformity, in particular having a highly homogeneous distribution of the α-olefin between the polymer molecules. However, EP 0 893 801 A1 does not disclose a possibility of having an insulation layer suitable for high temperature operation conditions, while simultaneously having very good mechanical and process properties.

Even though the use of polypropylene in insulation layers is known, there is still the need to improve the data transmission quality by tighter twisting. Additionally, the insulation layer being part of the cable should be possible to be run at present polyethylene extrusion line speeds (1000 to 1500 m/min) or faster without compromising eccentricity, surface quality, strip force and long-term stability of the resulting cable. However, polypropylene exhibits both a lower melting flux at comparable screw speed (see E. E. Stangland et al, Proc. SPE ANTEC 2002, Volume 1: Processing, Paper No. 448) requiring higher processing temperatures and a lower crystallization rate limiting the processing speed compared to polyethylene. Therefore, a combination of the aforementioned requirements is a challenge in developing new cables.

Thus, there is still a need for new cables based on polypropylene. There is in particular the need for cables which can be easily produced, i.e. have a higher crystallization temperature, and, simultaneously provide a high data transmission quality paired with a high stiffness or surface hardness.

The foregoing and other objectives are solved by the subject-matter of the present invention. Advantageous embodiments of the inventive method are defined in the corresponding sub-claims.

The present invention is based on the specific finding that this object can be solved by an insulation layer being part of a cable comprising a crystalline polypropylene (PP) homo- or copolymer being nucleated by a specific nucleating agent (NA).

According to a first aspect of the present invention, a cable having at least one insulation layer is provided, wherein the insulation layer comprises a polymer composition (PC) comprising, preferably consisting of,
(a) at least 94.0 wt.-%, based on the total weight of the polymer composition (PC), of a crystalline polypropylene (PP) homo- or copolymer having a melt flow rate according to ISO 1133 (230° C./2.16 kg) in the range of 1.0 g/10 min to 10.0 g/10 min and a comonomer content of below 5.0 wt.-%, the comonomers are ethylene and/or a $C_4$ to $C_{10}$ α-olefin,
(b) 0.5 wt.-% to 5.0 wt.-%, based on the total weight of the polymer composition (PC), of an adhesion promoter (AP) being a polar modified polypropylene (PM-PP) homo- or copolymer,
(c) 0.0001 to 1.0 wt-%, based on the total weight of the polymer composition (PC), of a polymeric α-nucleating agent (pNA), and
(d) optionally 0.02 to 1.0 wt.-%, based on the total weight of the polymer composition (PC), of a soluble α-nucleating agent (sNA).

In one embodiment the polymer composition (PC) additionally contains a soluble α-nucleating agent (sNA) and in another embodiment the polymer composition (PC) contains no soluble α-nucleating agent (sNA) but only the polymeric α-nucleating agent (pNA). Accordingly in one specific embodiment the polymer composition (PC) contains the polymeric α-nucleating agent (pNA) as the only α-nucleating agent.

The inventors surprisingly found that the foregoing product according to the present invention can be easily produced and provides a high data transmission quality paired with a high stiffness or surface hardness. More precisely, the inventors found that such a cable can be obtained if the insulation layer being part of the cable comprises an effectively nucleated polypropylene (PP) homo- or copolymer.

Another aspect of the present invention is directed to a process for producing such a cable, wherein the process comprises the steps of:
(a) forming a polymer composition (PC),
(b) applying the polymer composition (PC) of step a) at a melt temperature of 180° C. to 280° C. on a conductor to form an insulation layer, and
(c) producing the cable at a processing speed of 300 m/min to 3000 m/min.

It is preferred that the conductor is pre-heated to a temperature between 50° C. and 150° C.

A further aspect of the present invention is directed to the use of a polymeric α-nucleating agent (pNA) for increasing the crystallization temperature of such a polymer composition (PC) in a cable, wherein the polymeric α-nucleating agent (pNA) is a polymerized vinyl compound of formula (IV)

wherein R₁ and R₂ together form a 5 or 6 membered saturated or unsaturated or aromatic ring or they stand independently for a lower alkyl comprising 1 to 4 carbon atoms.

A still further aspect of the present invention is directed to the use of such a cable as communication cable and/or electrical cable.

When in the following reference is made to preferred embodiments or technical details of the inventive cable, it is to be understood that these preferred embodiments or technical details also refer to the inventive process for producing the cable, the inventive use of the polymeric α-nucleating agent (pNA) as well as the inventive use of the cable as communication cable and/or electrical cable. If, for example, it is set out that the inventive insulation layer of the cable preferably comprises a polymer composition (PC) comprising a crystalline polypropylene (PP) homo- or copolymer having a melt flow rate according to ISO 1133 (230° C./2.16 kg) in the range of 1.0 to 10.0 g/10 min, also the polymer composition (PC) provided in the inventive process as well as the inventive uses preferably comprise a polymer composition (PC) comprising a crystalline polypropylene (PP) homo- or copolymer having a melt flow rate according to ISO 1133 (230° C./2.16 kg) in the range of 1.0 to 10.0 g/10 min.

According to one preferred embodiment of the present invention, the crystalline polypropylene (PP) homo- or copolymer has (a) a melt flow rate according to ISO 1133 (230° C./2.16 kg) in the range of 1.0 to 10.0 g/10 min, preferably in the range of 1.0 to 8.0 g/10 min, more preferably in the range of 1.0 to 6.0 g/10 min and most preferably in the range of 1.0 to 5.0 g/10 min, and/or (b) a melting temperature Tm as determined by differential scanning calorimetry (DSC) in the range of 150 to 175° C., more preferably in the range of 155 to 170° C. and most preferably in the range of 158 to 168° C., and/or (c) a crystallization temperature Tc as determined by differential scanning calorimetry (DSC) in the range of 110 to 138° C., preferably in the range of 113 to 133° C. and most preferably in the range of 118 to 131° C.

According to another preferred embodiment of the present invention, the polymer composition (PC) has a Shore D hardness from 63 to 77, preferably from 64 to 75.

According to yet another preferred embodiment of the present invention, the polymer composition (PC) has a content of a fraction soluble in xylene at 25° C. from 0.5 to 8.5 wt.-%, preferably from 1.0 to 7.0 wt.-% and most preferably from 1.0 to 6.5 wt.-%, based on the total weight of the polymer composition (PC).

According to one preferred embodiment of the present invention, the polymer composition (PC) has a melting temperature Tm as determined by differential scanning calorimetry (DSC) in the range of 150 to 175° C., more preferably in the range of 155 to 170° C. and most preferably in the range of 158 to 168° C.

According to another preferred embodiment of the present invention, the polymer composition (PC) has a crystallization temperature Tc as determined by differential scanning calorimetry (DSC) in the range of 110 to 140° C., preferably in the range of 115 to 135° C., more preferably in the range of 118 to 131° C., most preferably in the range of 120 to 129° C.

According to yet another preferred embodiment of the present invention, the crystalline polypropylene (PP) homo- or copolymer is a polypropylene copolymer (C-PP). Preferably, the polymer composition (PC) has (a) a melt flow rate according to ISO 1133 (230° C./2.16 kg) in the range of 1.0 to 8.0 g/10 min, preferably in the range of 1.2 to 6.0 g/10 min, more preferably in the range of 1.5 g/10 min and 5.5 g/10 min and most preferably in the range of 2.0 to 5.0 g/10 min, and/or (b) a melting temperature Tm as determined by differential scanning calorimetry (DSC) in the range of 150 to 175° C., more preferably in the range of 155 to 170° C. and most preferably in the range of 158 to 168° C., and/or (c) a Shore D hardness from 65 to 80, preferably from 67 to 78 and most preferably from 68 to 75.

According to one preferred embodiment of the present invention, the crystalline polypropylene (PP) homo- or copolymer is a propylene copolymer (C-PP), preferably a random propylene copolymer (R-PP). Preferably, the polymer composition (PC) has (a) a melt flow rate according to ISO 1133 (230° C./2.16 kg) in the range of 1.0 and 8.0 g/10 min, preferably in the range of 1.2 and 6.0 g/10 min, more preferably in the range of 1.5 to 5.5 g/10 min and most preferably in the range of 2.0 to 5.0 g/10 min, and/or (b) a comonomer content in the range of 0.1 to 4.0 wt.-%, preferably in the range of 0.3 to 2.0 wt.-%, more preferably in the range of 0.4 to 1.5 wt.-% and most preferably in the range of 0.4 to 1.0 wt.-%, like in the range of 0.5 to 0.8 wt.-%, based on the total weight of the polymer composition (PC), the comonomers are ethylene and/or a $C_4$ to $C_{10}$ α-olefin, and/or (c) a melting temperature Tm as determined by differential scanning calorimetry (DSC) in the range of 145 to 168° C., more preferably in the range of 150 to 165° C. and most preferably in the range of 155 to 165° C., and/or (d) a Shore D hardness from 63 to 77, preferably from 64 to 75, more preferably from 65 to 75 and most preferably from 65 to 72.

According to another preferred embodiment of the present invention, the polymeric α-nucleating agent (pNA) (a) is a polymerized vinyl compound, said vinyl compound is selected from the group consisting of vinyl cycloalkanes, in particular vinyl cyclohexane (VCH), vinyl cyclopentane, vinyl-2-methyl cyclohexane and vinyl norbornane, 3-methyl-1-butene, 3-ethyl 1-hexene or mixtures thereof, and/or (b) present in the polymer composition (PC) in an amount between 0.0001 and 1.0 wt-%, preferably between 0.0001 and 0.1 wt.-%, more preferably between 0.0005 and 0.01 wt.-%, based on the total weight of the polymer composition (PC).

According to yet another preferred embodiment of the present invention, the adhesion promoter (AP) is a maleic anhydride modified polypropylene homo- or copolymer and/or an acrylic acid modified polypropylene homo- or copolymer, preferably a maleic anhydride modified polypropylene homopolymer and/or an acrylic acid modified polypropylene homopolymer and more preferably a maleic anhydride modified polypropylene homopolymer.

In the following the invention is described in more detail.

A cable having at least one insulation layer according to this invention comprises a polymer composition (PC) comprising, preferably consisting of, (a) at least 94.0 wt.-%, preferably at least 96.0 wt.-%, more preferably at least 98.0 wt.-%, based on the total weight of the polymer composition (PC), of a crystalline polypropylene (PP) homo- or copolymer having a melt flow rate according to ISO 1133 (230° C./2.16 kg) in the range of 1.0 g/10 min to 10.0 g/10 min and a comonomer content of below 5.0 wt.-%, the comonomers are ethylene and/or a $C_4$ to $C_{10}$ α-olefin, (b) 0.5 wt.-% to 5.0 wt.-%, preferably 0.8 to 2.5 wt.-%, more preferably 1.0 to 2.0 wt.-%, based on the total weight of the polymer composition (PC), of an adhesion promoter (AP) being a polar modified polypropylene (PM-PP) homo- or copolymer, (c) 0.0001 to 1.0 wt-%, preferably 0.0001 and 0.1 wt.-%, more preferably 0.0005 and 0.01 wt.-%, based on the total weight of the polymer composition (PC), of a polymeric α-nucleating agent (pNA), and (d) optionally 0.02 to 1.0 wt.-%, preferably 0.05 to 0.8 wt.-%, preferably 0.1 to 0.8 wt.-%, most preferably 0.2 to 0.6 wt.-% based on the total weight of the polymer composition (PC), of a soluble α-nucleating agent (sNA).

In a preferred embodiment the crystalline polypropylene (PP) homo- or copolymer, the polar modified polypropylene (PM-PP) homo- or copolymer and the polymeric α-nucleating agent (pNA) are the only polymer components in the polymer composition (PC). In a specific embodiment the crystalline polypropylene (PP) homo- or copolymer, the polar modified polypropylene (PM-PP) homo- or copolymer, the polymeric α-nucleating agent (pNA) and the optional soluble α-nucleating agent (sNA) are the only components in the polymer composition (PC), besides the typical additives as mentioned below.

In a preferred embodiment the weight ratio of polymeric α-nucleating agent (pNA) to crystalline polypropylene (PP) homo- or copolymer [pNA/PP] in the polymer composition (PC) is from 0.000001/1 to 0.02/1, more preferably from 0.000001/1 to 0.01/1, yet more preferably from 0.00001/1 to 0.01/1.

Additionally if a soluble α-nucleating agent (sNA) is present, the weight ratio of soluble α-nucleating agent (sNA) to crystalline polypropylene (PP) homo- or copolymer [sNA/PP] in the polymer composition (PC) is from 0.02/99.98 to 10.0/90.0, more preferably from 0.1/99.9 to 8.0/92.0, yet more preferably from 0.2/99.9 to 5.0/95.0.

Additionally if a soluble α-nucleating agent (sNA) is present, the weight ratio of soluble α-nucleating agent (sNA) to adhesion promoter (AP) [sNA/AP] in the polymer composition (PC) is from 1/250 to 1.0/2.0, more preferably from 1.0/20.0 to 1.0/2.0 and most preferably from 1.0/15.0 to 1.0/1.0.

Further it is appreciated that the weight ratio of crystalline polypropylene (PP) homo- or copolymer to adhesion promoter (AP) [PP/AP] in the polymer composition (PC) is from 99.5/0.5 to 94.0/5.0. For example, the weight ratio of crystalline polypropylene (PP) homo- or copolymer to adhesion promoter (AP) [PP/AP] in the polymer composition (PC) is from 99.5/0.5 to 97.0/3.0 and most preferably from 99.5/0.5 to 97.5/2.5. Alternatively, the weight ratio of crystalline polypropylene (PP) homo- or copolymer to adhesion promoter (AP) [PP/AP] in the polymer composition (PC) is from 97.0/3.0 to 95.0/5.0 and most preferably from 96.5/3.5 to 95.0/5.0.

Accordingly, the polymer composition (PC) as defined in the instant invention may contain at least 94.0 wt.-% of the crystalline polypropylene (PP) homo- or copolymer, based on the total weight of the polymer composition (PC). For example, the polymer composition (PC) comprises the crystalline polypropylene (PP) homo- or copolymer in an amount of at least 95.0 wt.-%, preferably at least 96.0 wt.-%, more preferably at least 97.0 wt.-%, even more preferably at least 98.0 wt.-% and most preferably at least 99.0 wt.-%, e.g. equal to 99.5 wt.-%. Preferably, the polymer composition (PC) comprises the crystalline polypropylene (PP) homo- or copolymer in amounts of between 94.0 wt.-% and 99.5 wt.-%, preferably between 95.0 wt.-% and 99.5 wt.-%, and most preferably between 98.0 wt.-% and 99.4 wt.-%.

Preferably the polymer composition (PC) has a melt flow rate $MFR_2$ (230° C.) measured according to ISO 1133 in the range of 1.0 and 8.0 g/10 min, more preferably in the range of 1.2 and 6.0 g/10 min, still more preferably in the range of 1.5 to 5.5 g/10 min, yet more preferably in the range of 2.0 to 5.0 g/10 min.

In one preferred embodiment, the polymer composition (PC) has a melt flow rate equal to the melt flow rate of the crystalline polypropylene (PP) homo- or copolymer.

Thus, the crystalline polypropylene (PP) homo- or copolymer and the polymer composition (PC) fulfill the relation (1), preferably relation (1a)

$$0.8 \times MFR(PP) \leq MFR(PC) \leq 1.2 \times MFR(PP) \quad (1)$$

$$0.9 \times MFR(PP) \leq MFR(PC) \leq 1.1 \times MFR(PP) \quad (1a)$$

wherein MFR (PP) is the melt flow rate $MFR_2$ (230° C.) [g/10 min] measured according to ISO 1133 of the crystalline polypropylene (PP) homo- or copolymer, and MFR (PC) is the melt flow rate $MFR_2$ (230° C.) [g/10 min] measured according to ISO 1133 of the polymer composition (PC).

Preferably, the polymer composition (PC) has a Shore D hardness from 63 to 77. For example, the polymer composition (PC) being part of the insulation layer preferably has a Shore D hardness from 64 to 75 and most preferably from 65 to 72.

Preferably the polymer composition (PC) being part of the insulation layer has a melting temperature Tm as determined by differential scanning calorimetry (DSC) in the range of 150 to 175° C., more preferably in the range of 155 to 170° C. and most preferably in the range of 158 to 168° C.

In one preferred embodiment, the polymer composition (PC) has a melting temperature Tm as determined by differential scanning calorimetry (DSC) equal to the melting temperature of the crystalline polypropylene (PP) homo- or copolymer. For example, the crystalline polypropylene (PP) homo- or copolymer and the polymer composition (PC) fulfill the relation (2), preferably relation (2a)

$$0.8 \times Tm(PP) \leq Tm(PC) \leq 1.2 \times Tm(PP) \quad (2)$$

$$0.9 \times Tm(PP) \leq Tm(PC) \leq 1.1 \times Tm(PP) \quad (2a)$$

wherein Tm (PP) is the melting temperature Tm as determined by differential scanning calorimetry (DSC) of the crystalline polypropylene (PP) homo- or copolymer, and Tm (PC) is the melting temperature Tm as determined by differential scanning calorimetry (DSC) of the polymer composition (PC).

Additionally or alternatively, the polymer composition (PC) being part of the insulation layer has a crystallization temperature Tc as determined by differential scanning calorimetry (DSC) in the range of 110 to 140° C., preferably in the range of 115 to 135° C., even more preferably in the range of 120 to 135° C. and most preferably in the range of 122 to 135° C.

Furthermore, it is appreciated that the xylene soluble content of the polymer composition (PC) is rather low. Accordingly the polymer composition (PC) preferably has a content of a fraction soluble in xylene at 25° C. from 0.5 to 8.5 wt.-%, based on the total weight of the polymer composition (PC). Thus, a preferred range is 1.0 to 7.0 wt.-% and most preferably 1.0 to 6.5 wt.-%, based on the total weight of the polymer composition (PC).

In the following the components of the polymer composition (PC) are described in more detail.

The first essential component of the polymer composition (PC) is the crystalline polypropylene (PP) homo- or copolymer. As mentioned above the crystalline polypropylene (PP) homo- or copolymer makes the major part of the polymer composition (PC). Accordingly several features of the polymer composition (PC) are influenced by the crystalline polypropylene (PP) homo- or copolymer and thus are rather similar. This applies especially for the melt flow rate, melting temperature, xylene soluble content.

Therefore the crystalline polypropylene (PP) homo- or copolymer has a melt flow rate $MFR_2$ (230° C.) measured according to ISO 1133 in the range of 1.0 to 10.0 g/10 min, preferably in the range of 1.0 and 8.0 g/10 min, more preferably in the range of 1.2 and 6.0 g/10 min, still more preferably in the range of 1.5 to 5.5 g/10 min, yet more preferably in the range of 2.0 to 5.0 g/10 min.

Further it is preferred that the crystalline polypropylene (PP) homo- or copolymer has a melting temperature Tm as determined by differential scanning calorimetry (DSC) in the range of 150 to 175° C., more preferably in the range of 155 to 170° C. and most preferably in the range of 158 to 168° C.

Additionally or alternatively, the crystalline polypropylene (PP) homo- or copolmer has a crystallization temperature Tc as determined by differential scanning calorimetry (DSC) in the range of 110 to 138° C., preferably in the range of 113 to 133° C., even more preferably in the range of 118 to 131° C. and most preferably in the range of 120 to 129° C.

Furthermore, the xylene soluble content in xylene at 25° C. of the crystalline polypropylene (PP) homo- or copolmer is from 0.5 to 8.5 wt.-%, based on the total weight of the crystalline polypropylene (PP) homo- or copolmer. Thus, a preferred range is 1.0 to 7.0 wt.-% and most preferably 1.0 to 6.5 wt.-%, based on the total weight of the crystalline polypropylene (PP) homo- or copolmer.

The amount of xylene cold solubles (XCS) additionally indicates that the crystalline polypropylene (PP) homo- or copolymer is preferably free of any elastomeric polymer component, like an ethylene propylene rubber. In other words, the crystalline polypropylene (PP) homo- or copolymer shall be not a heterophasic polypropylene, i.e. a system consisting of a polypropylene matrix in which an elastomeric phase is dispersed. Such systems are featured by a rather high xylene cold soluble content.

Accordingly it is preferred that the crystalline polypropylene (PP) homo- or copolmer according to this invention has no glass transition temperature below −30, preferably below −25° C., more preferably below −20° C.

In order to achieve the desired combination of processability and mechanical and electrical properties it is further preferred that the crystalline polypropylene (PP) homo- or copolmer shall have a narrow to medium broad molecular weight distribution. More specifically, it is desired that the ratio of weight and number average molecular weight, $M_w/M_n$, as calculated from the molecular weight distribution determined by size exclusion chromatography according to ISO 16014 ranges from 2.2 to 6.0, preferably from 2.5 to 5.0.

In one embodiment it is preferred that the crystalline polypropylene (PP) homo- or copolymer has a weight average molecular weight (Mw) in the range of 100 to 900 kg/mol, more preferably in the range of 150 to 750 kg/mol.

The properties mentioned for the crystalline polypropylene (PP) homo- or copolymer in the present invention are especially applicable for the propylene homopolymer (H-PP) and the propylene copolymer (C-PP), respectively, as defined below. The properties mentioned for the crystalline polypropylene (PP) homo- or copolymer in the present invention are in particular applicable for the propylene copolymer (C-PP), like the random propylene copolymer (R-PP), as defined in more detail below.

The crystalline polypropylene (PP) homo- or copolymer of the polymer composition (PC) can be a propylene homopolymer (H-PP) or a propylene copolymer (C-PP), the latter being preferred.

The expression propylene homopolymer (H-PP) used in the instant invention relates to a polypropylene that consists substantially, i.e. of more than 99.9 wt.-%, of propylene units. In a preferred embodiment only propylene units in the propylene homopolymer (H-PP) are detectable.

If the crystalline polypropylene (PP) homo- or copolymer is a propylene copolymer (C-PP) it is preferably a random propylene copolymer (R-PP).

The term random is understood according to IUPAC (Glossary of basic terms in polymer science; IUPAC recommendations 1996). Accordingly it is preferred that the random polypropylene copolymer (R-PP) has a randomness of at least 40%, more preferably of at least 50%, yet more preferably at least 55%, even more preferably of at least 60%, and still more preferably of at least 65%.

In case the crystalline polypropylene (PP) homo- or copolymer is a propylene copolymer (C-PP), e.g. a random propylene copolymer (R-PP), it comprises monomers copolymerizable with propylene, for example comonomers such as ethylene and/or $C_4$ to $C_{10}$ α-olefins, in particular ethylene and/or $C_4$ to $C_8$ α-olefins, e.g. 1-butene and/or 1-hexene. Preferably the propylene copolymer (C-PP), like the random propylene copolymer (R-PP), comprises, especially consists of, monomers copolymerizable with propylene from the group consisting of ethylene, 1-butene and 1-hexene. More specifically, the propylene copolymer (C-PP), like the random propylene copolymer (R-PP), comprises—apart from propylene—units derivable from ethylene and/or 1-butene. In a preferred embodiment of the present invention, the propylene copolymer (C-PP), like the random propylene copolymer (R-PP), comprises units derivable from ethylene and propylene only.

The comonomer content in the propylene copolymer (C-PP), like in the random propylene copolymer (R-PP), is preferably relatively low, i.e. below 4.0 wt.-%. In one preferred embodiment, the comonomer content is preferably in the range of 0.1 to 4.0 wt.-%, more preferably in the range of 0.3 to 2.0 wt.-%, even more preferably in the range of 0.4 to 1.5 wt.-% and most preferably in the range of 0.4 to 1.0 wt.-%, based on the total weight of the propylene copolymer (C-PP), like of the random propylene copolymer (R-PP).

Preferably the crystalline polypropylene (PP) homo- or copolymer is isotactic. Accordingly it is appreciated that the crystalline polypropylene (PP) homo- or copolymer has a rather high isotactic triad concentration, i.e. higher than 90%, more preferably higher than 92%, still more preferably higher than 93% and yet more preferably higher than 95%, like higher than 97%.

The crystalline polypropylene (PP) homo- or copolymer according to this invention can be produced in a known manner, for instance in the presence of a Ziegler-Natta catalyst. Further the polymerization system can comprise one or more conventional stirred slurry reactors and/or one or more gas phase reactors. Preferably the reactors used are selected from the group of loop and gas phase reactors and, in particular, the process employs at least one loop reactor and at least one gas phase reactor. It is also possible to use several reactors of each type, e.g. one loop and two or three gas phase reactors, or two loops and one or two gas phase reactors, in series.

Preferably the process comprises also a prepolymerisation with the chosen catalyst system, as described in detail below, comprising the Ziegler-Natta procatalyst, the external donor and the cocatalyst.

In a preferred embodiment, the prepolymerisation is conducted as bulk slurry polymerization in liquid propylene, i.e. the liquid phase mainly comprises propylene, with minor amount of other reactants and optionally inert components dissolved therein.

The prepolymerisation reaction is typically conducted at a temperature of 0 to 50° C., preferably from 10 to 45° C., and more preferably from 15 to 40° C.

The pressure in the prepolymerisation reactor is not critical but must be sufficiently high to maintain the reaction mixture in liquid phase. Thus, the pressure may be from 20 to 100 bar, for example 30 to 70 bar.

The catalyst components are preferably all introduced to the prepolymerisation step. However, where the solid catalyst component (i) and the cocatalyst (ii) can be fed separately it is possible that only a part of the cocatalyst is introduced into the prepolymerisation stage and the remaining part into subsequent polymerization stages. Also in such cases it is necessary to introduce so much cocatalyst into the prepolymerisation stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

A slurry reactor designates any reactor, such as a continuous or simple batch stirred tank reactor or loop reactor, operating in bulk or slurry and in which the polymer forms in particulate form. "Bulk" means a polymerization in reaction medium that comprises at least 60 wt.-% monomer. According to a preferred embodiment the slurry reactor comprises a bulk loop reactor.

"Gas phase reactor" means any mechanically mixed or fluid bed reactor. Preferably the gas phase reactor comprises a mechanically agitated fluid bed reactor with gas velocities of at least 0.2 m/sec.

The particularly preferred embodiment for the preparation of the crystalline polypropylene (PP) homo- or copolymer of the invention the polymerization carried out in a process comprising either a combination of one loop and one or two gas phase reactors or a combination of two loops and one or two gas phase reactors.

A preferred multistage process is a slurry-gas phase process, such as developed by *Borealis* and known as the Borstar® technology. In this respect, reference is made to EP 0 887 379 A1, WO 92/12182, WO 2004/000899, WO 2004/111095, WO 99/24478, WO 99/24479 and WO 00/68315. They are incorporated herein by reference.

A further suitable slurry-gas phase process is the Spheripol® process of Basell.

Preferably the crystalline polypropylene (PP) homo- or copolymer according to this invention is produced by using a special Ziegler-Natta procatalyst in combination with a special external donor, as described below in detail, preferably in the Spheripol® or in the Borstar®-PP process.

With respect to the above-mentioned preferred slurry-gas phase process, the following general information can be provided with respect to the process conditions.

Temperature is preferably from 40 to 110° C., preferably between 50 and 100° C., in particular between 60 and 90° C., with a pressure in the range of from 20 to 80 bar, preferably 30 to 60 bar, with the option of adding hydrogen in order to control the molecular weight in a manner known per se.

The reaction product of the slurry polymerization, which preferably is carried out in a loop reactor, is then transferred to the subsequent gas phase reactor(s), wherein the temperature preferably is within the range of from 50 to 130° C., more preferably 60 to 100° C., at a pressure in the range of from 5 to 50 bar, preferably 8 to 35 bar, again with the option of adding hydrogen in order to control the molecular weight in a manner known per se.

The average residence time can vary in the reactor zones identified above. In one embodiment, the average residence time in the slurry reactor, for example a loop reactor, is in the range of from 0.5 to 5 hours, for example 0.5 to 2 hours, while the average residence time in the gas phase reactor generally will be from 1 to 8 hours.

If desired, the polymerization may be effected in a known manner under supercritical conditions in the slurry, preferably loop reactor, and/or as a condensed mode in the gas phase reactor.

According to the invention the crystalline polypropylene (PP) homo- or copolymer is preferably obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention is prepared by
  a) reacting a spray crystallized or emulsion solidified adduct of $MgCl_2$ and a $C_1$-$C_2$ alcohol with $TiCl_4$
  b) reacting the product of stage a) with a dialkylphthalate of formula (I)

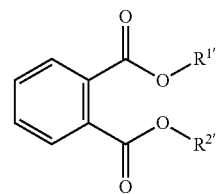

(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor
  c) washing the product of stage b) or
  d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula MgCl$_2$*nROH, wherein R is methyl or ethyl, preferably ethyl and n is 1 to 6, is contacting with TiCl$_4$ to form a titanised carrier, followed by the steps of adding to said titanised carrier
(i) a dialkylphthalate of formula (I) with R$^{1'}$ and R$^{2'}$ being independently at least a C$_5$-alkyl, like at least a C$_8$-alkyl,
or preferably
(ii) a dialkylphthalate of formula (I) with R$^{1'}$ and R$^{2'}$ being the same and being at least a C$_5$-alkyl, like at least a C$_8$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol-%, of a dialkylphthalate of formula (II)

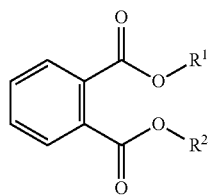

(II)

with R$^1$ and R$^2$ being methyl or ethyl, preferably ethyl, the dialkylphthalat of formula (II) being the internal donor and
recovering said transesterification product as the procatalyst composition (component (i)).

The adduct of the formula MgCl$_2$*nROH, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

In a further embodiment, the Ziegler-Natta procatalyst is modified by polymerising a vinyl compound of formula (I) as defined in detail below in the presence of the catalyst system, comprising the special Ziegler-Natta procatalyst, an external donor and a cocatalyst. This so modified catalyst is used for the preparation of the crystalline polypropylene (PP) homo- or copolymer according to this invention. The polymerized vinyl compound acts as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

For the production of the crystalline polypropylene (PP) homo- or copoly according to the invention, the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (IIIb). Formula (IIIa) is defined by

wherein R$^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that R$^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by

wherein R$^x$ and R$^y$ can be the same or different a represent a hydrocarbon group having 1 to 12 carbon atoms.

R$^x$ and R$^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that R$^x$ and R$^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both R$^x$ and R$^y$ are the same, yet more preferably both R$^x$ and R$^y$ are an ethyl group.

More preferably the external donor of formula (IIIb) is diethylaminotriethoxysilane.

Most preferably the external donor is of formula (IIIa), like dicyclopentyl dimethoxy silane [Si(OCH$_3$)$_2$(cyclo-pentyl)$_2$] or diisopropyl dimethoxy silane [Si(OCH$_3$)$_2$(CH(CH$_3$)$_2$)$_2$].

Another suitable external donor is cyclohexyl trimethoxy silane.

In accordance with the present invention, the polymer composition (PC) further comprises an adhesion promoter (AP). The adhesion promoter (AP) is specified as being a polar modified polypropylene (PM-PP) homo- or copolymer.

The polar modified polypropylene (PM-PP) homo- or copolymer comprises a low molecular weight compound having reactive polar groups. Modified polypropylene homopolymers and copolymers, like copolymers of propylene and ethylene or with other α-olefins, e.g. C$_4$ to C$_{10}$ α-olefins, are most preferred, as they are highly compatible with the crystalline polypropylene (PP) homo- or copolymers of the inventive polymer composition (PC).

In terms of structure, the polar modified polypropylene (PM-PP) homo- or copolymer are preferably selected from graft homo- or copolymers.

In this context, preference is given to polar modified polypropylene (PM-PP) homo- or copolymers containing groups derived from polar compounds, in particular selected from the group consisting of acid anhydrides, carboxylic acids, carboxylic acid derivatives, primary and secondary amines, hydroxyl compounds, oxazoline and epoxides, and also ionic compounds.

Specific examples of said polar compounds are unsaturated cyclic anhydrides and their aliphatic diesters, and the diacid derivatives. In particular, one can use maleic anhydride and compounds selected from C$_1$ to C$_{10}$ linear and branched dialkyl maleates, C$_1$ to C$_{10}$ linear and branched dialkyl fumarates, itaconic anhydride, C$_1$ to C$_{10}$ linear and branched itaconic acid dialkyl esters, acrylic acid, maleic acid, fumaric acid, itaconic acid and mixtures thereof.

Particular preference is given to use a polypropylene homo- or copolymer grafted with maleic anhydride or acrylic acid as the polar modified polypropylene (PM-PP) homo- or copolymer, i.e. the adhesion promoter (AP).

The modified polymer, i.e. the adhesion promoter, can be produced in a simple manner by reactive extrusion of the polymer, for example with maleic anhydride or acrylic acid in the presence of free radical generators (like organic peroxides), as disclosed for instance in U.S. Pat. Nos. 4,506,056, 4,753,997 or EP 1 805 238.

Preferred amounts of groups derived from polar compounds in the polar modified polypropylene (PM-PP) homo- or copolymer, i.e. the adhesion promoter (AP), are from 0.5 to 10 wt.-%. For example, in the range of 0.5 wt.-% to 8 wt.-%, preferable in the range of 0.5 wt.-% to 6 wt.-%, more preferably in the range of 0.5 wt.-% to 4 wt.-% and most preferably in the range of 0.5 wt.-% to 3.5 wt.-%.

Preferred values of the melt flow rate MFR$_2$ (230° C.) for the polar modified polypropylene (PM-PP) homo- or copolymer, i.e. for the adhesion promoter (AP), are from 2 to 500 g/10 min.

In one preferred embodiment of the present invention, the adhesion promoter (AP) is a maleic anhydride modified polypropylene homo- or copolymer and/or an acrylic acid modified polypropylene homo- or copolymer. Preferably, the adhesion promoter (AP) is a maleic anhydride modified polypropylene homopolymer and/or an acrylic acid modified polypropylene homopolymer and preferably a maleic anhydride modified polypropylene homopolymer. For example, suitable polar modified polypropylene (PM-PP) homo- or copolymers include, for example, a polypropylene homopolymer grafted with maleic anhydride (PP-g-MAH) and a polypropylene homopolymer grafted with acrylic acid (PP-g-AA).

The polymer composition (PC) as defined in the instant invention contains between 0.5 and 5.0 wt.-%, preferably between 0.5 and 3.5 wt.-%, more preferably between 0.8 and 2.5 wt % and still more preferably 1.0 to 2.0 wt %, polar modified polypropylene (PM-PP) homo- or copolymer.

A further essential component of the present invention is the polymeric α-nucleating agent (pNA) for increasing the crystallization temperature of the polymer composition (PC) in a cable. Preferably the polymeric α-nucleating agent (pNA) is a polymerized vinyl compound of formula (IV) wherein R$_1$ and R$_2$ together form a 5 or 6 membered saturated or unsaturated or aromatic ring or they stand independently for a lower alkyl comprising 1 to 4 carbon atoms.

Preferably the polymeric α-nucleating agent (pNA) is a polymerized vinyl compound selected from the group consisting of vinyl cycloalkanes, in particular vinyl cyclohexane (VCH), vinyl cyclopentane, vinyl-2-methyl cyclohexane and vinyl norbornane, 3-methyl-1-butene, 3-ethyl 1-hexene or mixtures thereof. It is especially preferred that the polymeric α-nucleating agent (pNA) is a polymerized a vinyl cycloalkane, especially polymerized vinyl cyclohexane (pVCH).

The polymeric α-nucleating agent (pNA), preferably the polymerized vinyl compound of formula (I) as defined in more detail above, is especially introduced into the polymer composition (PC), by producing the crystalline polypropylene (PP) homo- or copolymer with a modified catalyst which has been prepolymerized with vinyl compounds as defined above. This means that the vinyl compounds should be completely reacted in the polymerization step. To that end, the weight ratio of the (added) vinyl compound to the catalyst should be in the range of 0.05 to less than 3, preferably about 0.1 to 2.0 and in particular about 0.1 to 1.5. Further detailed information can be gathered from WO 99/24478, WO 00/68315 and EP 1183307 A1. Accordingly the polymeric α-nucleating agent (pNA) as defined herein is intimately mixed with the crystalline polypropylene (PP) homo- or copolymer.

Further it is preferred that the polymer composition (PC) contains a polymeric α-nucleating agent (pNA), preferably a polymerized vinyl compound of formula (I), more preferably polymerized vinyl cyclohexane (pVCH), in an amount of 0.0001 to 1.0 wt-%, preferably in an amount of 0.0001 to 0.1 wt.-%, more preferably in an amount of 0.0005 to 0.01 wt.-%, based on the total weight of the polymer composition (PC).

In one embodiment the polymer composition (PC), still more preferably the insulation layer of the cable comprising the polymer composition (PC), contains the polymeric α-nucleating agent (pNA) as the only α-nucleating agent. In another embodiment the polymer composition (PC), still more preferably the insulation layer of the cable comprising the polymer composition (PC), contains the polymeric α-nucleating agent (pNA) and a soluble α-nucleating agent (sNA) as the only α-nucleating agents.

It is especially preferred that the polymer composition (PC), still more preferably the insulation layer of the cable comprising the polymer composition (PC), contains the polymeric α-nucleating agent (pNA) as the only α-nucleating agent.

In case a soluble α-nucleating agent (sNA) is present the following information with regard to this α-nucleating agent is provided.

The term "soluble" in connection with the soluble α-nucleating agent (NA) indicates that the soluble α-nucleating agent (sNA) particles are dissolved in the melt of the crystalline polypropylene (PP) homo- or copolymer during melt-mixing and will recrystallize from said melt upon solidification. In other words, the crystalline polypropylene (PP) homo- or copolymer and the soluble α-nucleating agent (sNA) particles do not form a mixture of separate particles (dry blends) but a microscale dispersion of recrystallized fibrils of the nucleating agent, said fibrils having a diameter of less than 0.25 µm, preferably less than 0.1 µm, measured according by transmission electron microscopy (TEM) or scanning (atomic) force microscopy (AFM). Examples for such determinations can be found in the literature, e.g. by Shepard et al., J. Polym. Sci. B: Polym. Phys. 35, p. 2617-2628 (1997) and by Lipp et al., Langmuir, 22, p. 6398-640 (2006).

Preferred soluble α-nucleating agent (sNA)s are those which are soluble in the crystalline polypropylene (PP) homo- or copolymer. Soluble α-nucleating agents (sNA) are characterized by demonstrating a sequence of dissolution in heating and recrystallization in cooling to improve the degree of dispersion. Methods for determining said dissolution and recrystallization are described for example by Kristiansen et al. in Macromolecules 38 (2005) pages 10461-10465 and by Balzano et al. in Macromolecules 41 (2008) pages 5350-5355. In detail, the dissolution and recrystallization can be monitored by means of melt rheology in dynamic mode as defined by ISO 6271-10:1999.

Accordingly, it is preferred that the soluble α-nucleating agent (sNA) is selected from the group consisting of sorbitol derivatives, nonitol derivatives, benzene-trisamides, and mixtures thereof.

Suitable sorbitol derivatives are di(alkylbenzylidene)sorbitols, like 1,3:2,4-dibenzylidenesorbitol or bis-(3,4-dimethylbenzylidene)sorbitol.

Suitable nonitol derivatives include 1,2,3-trideoxy-4,6:5,7-bis-O-[(4-propylphenyl)methylene]-nonitol, while suitable benzene-trisamides include substituted 1,3,5-benzenetrisamides, like N,N',N''-tris-tert-butyl-1,3,5-benzenetricarboxamide or N,N',N''-tris-cyclohexyl-1,3,5-benzene-tricarboxamide.

Especially preferred are di(alkylbenzylidene)sorbitols, like 1,3:2,4-dibenzylidenesorbitol or bis-(3,4-dimethylbenzylidene)sorbitol or nonitol derivatives, like 1,2,3-trideoxy-4,6:5,7-bis-O-[(4-propylphenyl)methylene]-nonitol.

In one preferred embodiment, the soluble α-nucleating agent (sNA) is a nonitol derivative.

In one especially preferred embodiment, the soluble α-nucleating agent (sNA) is 1,2,3-trideoxy-4,6:5,7-bis-O-[(4-propylphenyl)methylene]-nonitol.

The soluble α-nucleating agent (sNA) if present is combined with the crystalline polypropylene (PP) homo- or copolymer and the adhesion promoter (AP) in a concentration between 200 and 10000 ppm by weight, preferably between 1000 and 8000 ppm by weight, more preferably between 1500 and 6000 ppm by weight and most preferably between 2000 and 5000 ppm by weight.

In accordance with the present application, the at least one insulation layer comprises, preferably comprises at least 70 wt.-%, more preferably comprises at least 80 wt.-%, still more preferably comprises at least 90 wt.-%, yet more preferably comprises at least 95 wt.-%, like comprises at least 99 wt.-%, of the polymer composition (PC). In one specific embodiment the at least one insulation layer consists of the polymer composition (PC).

In accordance with the present application, the insulation layer comprising the above described polymer composition (PC) is part of a cable.

In addition to said polymer composition (PC) comprising the specific crystalline polypropylene (PP) homo- or copolymer, adhesion promoter (AP) and the polymeric α-nucleating agent (pNA) (optionally the soluble α-nucleating agent (sNA)) also commonly used additives like phenolic antioxidants phosphorus-containing antioxidants, C-radical scavengers, acid scavengers, UV-stabilisers, antistatic agents, slip agents, and antiblocking agents can be added to the insulation layer. These components are well known for the skilled person and may be used in the common amounts and are selected by the skilled person as they are required and according to the respective purpose for which the polymer composition (PC) shall be used. Accordingly, it is also understood that the sum of the weights of the polymer composition (PC) in the insulation layer does usually not exactly add up to 100 wt.-%, but somewhat less, depending upon the amount of additives, which—in total—do usually not exceed 5 wt.-%.

In one preferred embodiment of the present invention, the cable is an electrical cable, in particular a communication cable, comprising a conductor and at least one insulation layer which comprises the polymer composition (PC) as defined above. In another preferred embodiment, the cable is a communication cable, comprising one or more wires surrounded by at least one insulation layer, and the one wire or a bundle of the two or more wires is further surrounded by at least a jacketing layer which forms the outermost polymeric layer for protecting the one or more wires.

In this regard, a communication cable is a cable for transferring information signals like telecommunication cables or coaxial cables. A telecommunication cable comprises a plurality of telesingle wires each surrounded by an insulation layer. The number of telesingle wires may vary from a few in a data transmission cable to up to several thousands in telephone cables. All wires are surrounded by a common protective jacketing layer, which surrounds and protects the wire bundle.

Said cable preferably comprises a metal conductor, even more preferably a copper conductor, having a diameter of 0.30 to 0.80 mm, preferably of 0.35 to 0.75 mm, most preferably of 0.40 to 0.70 mm. The cable including the insulation layer will preferably have a diameter of 0.60 to 1.50 mm, more preferably of 0.65 to 1.30 mm, and most preferably of 0.69 to 1.10 mm.

The current invention also provides cables having excellent surface quality and adhesion quality.

Preferably, the inventive cable provides a strip force of 8.0 N or more, more preferably of 8.5 N or more, still more preferably of 9.0 N or more and most preferably of 9.5 N or more. The strip force is defined to be the force needed to peel off an insulation layer formed of the insulating polymer composition (PC) in accordance with ASTM D 4565, part 19.

The cable can be prepared by known methods. In general, the process for producing a cable comprising the above polymer composition (PC) as part of an insulation layer comprises the steps of (a) forming the polymer composition (PC), (b) applying said polymer composition (PC) at a melt temperature of 180° C. to 280° C. on a conductor to form an insulation layer, and (c) producing the cable at a processing speed of 300 m/min to 3000 m/min.

Forming the polymer composition (PC) of step (a) is preferably achieved by mixing the crystalline polypropylene (PP) homo- or copolymer containing the α polymeric α-nucleating agent (pNA) with adhesion promoter (AP) being a polar modified polypropylene (PM-PP) homo- or copolymer, and optionally with the soluble α-nucleating agent (sNA) if present.

For mixing, a conventional compounding or blending apparatus, e.g. a Banbury mixer, a 2-roll rubber mill, Buss-co-kneader or a twin screw extruder may be used. The twin screw extruder may be co-rotating or counter-rotating, preferably co-rotating. In accordance with step (b) of the instant process, the formed polymer composition (PC) is applied on a conductor to form an insulation layer. Preferably, this is achieved by extruding said polymer composition (PC) onto the conductor. The temperatures and pressures used in the operation of the extruder are known in the art. Typically the temperature may be selected from the range of 180° C. to 280° C., preferably from the range of 200° C. to 250° C. The pressure used for extrusion is preferably between 50 bar and 700 bar and preferably between 200 bar and 500 bar. The polymer composition (PC) is passed through the extruder on the conductor at a processing speed of 300 m/min to 3000 m/min. Preferably, the polymer composition (PC) is passed through the extruder on the conductor at a processing speed of 500 m/min to 2000 m/min and more preferably at a processing speed of 600 m/min to 1800 m/min In one preferred embodiment, the conductor is pre-heated to a temperature of between 50° C. and 150° C.

According to a further aspect, the present invention provides the use of the polymeric α-nucleating agent (pNA) (optionally together with the soluble α-nucleating agent (sNA)) for increasing the crystallization temperature of a polymer composition (PC) being part of an insulation layer of a cable as defined above. According to another aspect, the present invention refers to the use of the above defined cable as communication cable and/or electrical cable.

Concerning further preferred embodiments of crystalline polypropylene (PP) homo- or copolymer, the adhesion promoter (AP), and the polymeric α-nucleating agent (pNA) (optionally together with the soluble α-nucleating agent (sNA)) being part of the polymer composition (PC) of the insulation layer, it is referred to the comments made above.

The present invention will now be described in further detail by the examples provided below.

EXAMPLES

1. Definitions/Measuring Methods

The following definitions of terms and determination methods apply for the above general description of the invention as well as to the below examples unless otherwise defined.

NMR-Spectroscopy Measurements:

The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the triad analysis the assignment is done according to the methods described in literature: (T. Hayashi, Y. Inoue, R. Chüjö, and T. Asakura, Polymer 29 138-43 (1988). and Chujo R, et al, Polymer 35 339 (1994).

The NMR-measurement was used for determining the mm triad concentration in a manner well known in the art.

Melting temperature Tm, crystallization temperature Tc: measured with Mettler TA820 differential scanning calorimetry (DSC) on 5 to 10 mg samples. DSC is run according to ISO 3146/part 3/method C2 in a heat/cool/heat cycle with a scan rate of 10° C./min in the temperature range of +23 to +210° C. Crystallization temperature and enthalpy are determined from the cooling step, while melting temperature and melting enthalpy are determined from the second heating step Randomness In the FTIR measurements, films of 250-mm thickness were compression moulded at 225° C. and investigated on a Perkin-Elmer System 2000 FTIR instrument. The ethylene peak area (760-700 cm$^{-1}$) was used as a measure of total ethylene content. The absorption band for the structure -P-E-P- (one ethylene unit between propylene units), occurs at 733 cm$^{-1}$. This band characterizes the random ethylene content. For longer ethylene sequences (more than two units), an absorption band occurs at 720 cm$^{-1}$. Generally, a shoulder corresponding to longer ethylene runs is observed for the random copolymers. The calibration for total ethylene content based on the area and random ethylene (PEP) content based on peak height at 733 cm$^{-1}$ was made by $^{13}$C NMR. (Thermochimica Acta, 66 (1990) 53-68).

Randomness=random ethylene(-P-E-P-)content/the total ethylene content×100%.

Number average molecular weight ($M_n$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

MFR$_2$ (230° C.) is measured according to ISO 1133 (230° C., 2.16 kg load).

MFR$_2$ (190° C.) is measured according to ISO 1133 (190° C., 2.16 kg load).

Ethylene content is measured with Fourier transform infrared spectroscopy (FTIR) calibrated with $^{13}$C-NMR. When measuring the ethylene content in polypropylene, a thin film of the sample (thickness about 250 mm) was prepared by hot-pressing. The area of absorption peaks 720 and 733 cm$^{-1}$ was measured with Perkin Elmer FTIR 1600 spectrometer. The method was calibrated by ethylene content data measured by $^{13}$C-NMR. Content of any one of the C4 to C10 α-olefins is determined with $^{13}$C-NMR; literature: "IR-Spektroskopie für Anwender"; WILEY-VCH, 1997 and "Validierung in der Analytik", WILEY-VCH, 1997.

The xylene cold solubles (XCS, wt.-%): Content of xylene cold solubles (XCS) is determined at 23° C. according ISO 6427.

Shore D hardness is measured at 3 and 15 seconds according to ASTM D2240-05.

REact parameter: The materials were pressed into films and circular samples were punched out of the films with weight of ca. 2 mg. DSC runs were performed with heating rate of 20° C./min to the temperature of 210° C. which was kept constant for 10 minutes. The samples were then cooled with different cooling rates (3, 10, 30, 100° C./min) and the crystallization temperature at each cooling rate was recorded. The quenching resistance was evaluated with a phenomenological dimensionless parameter "REact" often related to activation energy, $E_{act}$, for various phenomena. This approach was first described by H. E. Kissinger in Journal of Research of the National Bureau of Standards 1956, volume 57, issue 4, page 217, equation 7, for the differential thermal analysis of kaolinite clays, and afterwards used also for polymer crystallization.

$$"REact" = -R^{-1}E_{act} = \frac{d\left[\ln\left(\frac{T'}{T_{cr}^2}\right)\right]}{d\left(\frac{1}{T_{cr}}\right)}$$

where T' is the cooling rate from the melt, $T_{cr}$ is the crystallization temperature, R is the gas constant. This "REact" parameter was found to correlate well with the crystallization temperature at cooling rates in the order of 30° C./s, from DSC plots of crystallization temperature vs. cooling rate, as well as with the α phase crystalline content of cables as measured with the deconvolution of Wide Angle X-Ray Scattering patterns.

Surface quality: The final cable was assessed optically by an experienced person and ranked on a relative scale from 1 to 10, on which "1" stands for massive roughness going to the point of defects in the insulation layer while "10" stands for a perfectly smooth and homogeneous surface.

Strip force: ASTM D 4565, part 19 is used to measure insulation adhesion to the conductor. The samples are prepared according to the standard, cutting out a 130 mm long section of the insulated cable and removing the insulation until only a 25 mm long insulated section remains. The sample is conditioned for 16 h at ambient temperature at 50% relative atmospheric humidity. The bared conductor is then passed through a die plate or orifice having an aperture measuring 0.07 to 0.13 mm larger than the conductor until the shoulder of insulation rests on the die plate. Using a tensile testing setup with a load cell tension between the conductor and the die plate is applied and the force required to strip the remaining insulation from the wire is recorded. The maximal force is registered.

2. Polymers

XPP1 is an experimental polypropylene random copolymer containing small amounts of etylene (0.65 wt.-%) and 50 ppm of polymerized vinyl cyclohexane (pVCH), produced in a Borstar PP pilot unit with one loop and one gas phase reactor. A catalyst prepolymerized with pVCH as described in example 1 of EP 1183307 A1 was used in combination with triethylaluminium as cocatalyst and dicyclopentyl dimethoxy silane as external donor with an aluminium to donor ratio of 10 mol/mol. This polymer was mixed with 0.1 wt.-% of Irganox B225 (1:1-blend of Irganox 1010 (Pentaerythrityl-tetrakis(3-(3',5'-di-tert.butyl-4-hydroxytoluyl)-propionate and tris(2,4-di-t-butylphenyl)phosphate)phosphite) of BASF AG, Germany) and 0.05 wt % calcium stearate in a co-rotating twin-screw extruder (type: Coperion ZSK 57). Details of the polymerization as well as characteristics of the polymer can be taken from Table 1.

TABLE 1

Polymerization and characzeristics of XPP1

|  |  | XPP1 |
|---|---|---|
| Loop |  |  |
| Temperature | [° C.] | 70 |
| MFR$_2$ | [g/10 min] | 3.9 |
| C2 content | [wt-%] | 0.65 |

TABLE 1-continued

Polymerization and characzeristics of XPP1

|  |  | XPP1 |
|---|---|---|
| H$_2$/C3 ratio | [mol/kmol] | 2.0 |
| C2/C3 ratio | [mol/kmol] | 1.1 |
| amount | [wt.-%] | 55 |
| 1 GPR |  |  |
| Temperature | [° C.] | 85 |
| MFR$_2$ | [g/10 min] | 3.9 |
| C2 content | [wt-%] | 0.65 |
| H$_2$/C3 ratio | [mol/kmol] | 19.0 |
| C2/C3 ratio | [mol/kmol] | 1.2 |
| amount | [wt.-%] | 45 |
| Final |  |  |
| MFR$_2$ | [g/10 min] | 3.9 |
| C2 content | [wt.-%] | 0.65 |
| XCS | [wt.-%] | 2.0 |
| Tm | [° C.] | 161 |
| Tc | [° C.] | 124 |
| Mw | [kg/mol] | 430 |
| Mw/Mn | [—] | 3.9 |

DM55pharm is a polypropylene homopolymer having a melting temperature of 164° C., an XCS content of 2.0 wt % and an MFR$_2$ (230° C.) of 2.8 g/10 min, commercially available from Borealis Polyolefine GmbH, Austria. It has a weight average molecular weight (Mw) of 480 kg/mol and a broadness of the molecular weight distribution expressed as Mw/Mn of 4.7. "PP-R" is an experimental propylene-ethylene random copolymer which was produced based on the commercial Avant ZN M1 catalyst supplied by LyondellBasell, USA in combination with triethylaluminium as cocatalyst and cyclohexyl trimethoxy silane as external donor with an aluminium to donor ratio of 5 mol/mol. The polymerization was performed in a Borstar PP plant using one liquid-phase loop rector and two gas phase reactors. The resulting copolymer had an ethylene content of 2.0 wt %, an MFR$_2$ (230° C./2.16 kg) of 1.9 g/10 min, a melting temperature of 149° C. and a xylene cold soluble (XCS) content of 4.5 wt.-%. This polymer was mixed with 0.1 wt % of Irganox B225 (1:1-blend of Irganox 1010 (Pentaerythrityl-tetrakis(3-(3',5'-di-tert.butyl-4-hydroxytoluyl)-propionate and tris(2,4-di-t-butylphenyl)phosphate)phosphite) of BASF AG, Germany) and 0.04 wt % synthetic hydrotalcite (DHT-4A supplied by Kisuma Chemicals, Netherlands) in a co-rotating twin-screw extruder (type: Coperion ZSK 57).

HE3366 is a high-density polyethylene polymer designed for data cable insulation having an MFR$_2$ (190° C.) of 0.8 g/10 min commercially available from *Borealis* Polyolefine GmbH, Austria.

HE4872 is a high-density polyethylene polymer composition comprising an adhesion promoter designed for data cable insulation having an MFR$_2$ (190° C.) of 0.9 g/10 min commercially available from *Borealis* Polyolefine GmbH, Austria.

3. Nucleating Agent (sNA)

Millad NX8000 is the soluble α-crystal nucleating agent (NA) 1,2,3-trideoxy-4,6:5,7-bis-O-[(4-propylphenyl)methylene]-nonitol (CAS No. 882073-43-0) commercially available from Miliken Co., USA. Millad NX8000 is used in an amount of 0.25 wt.-%, based on the total weight of the polymer composition (PC).

4. Further Additives

All polypropylene types were specifically modified for cable insulation purposes by adding 0.1 wt.-% of the metal deactivator Lowinox MD 24 (N,N'-bis(3(3',5'-di-tert. butyl-4'-hydroxyphenyl)propionyl) hydrazine, CAS No. 32687-78-8, supplied by Chemtura Europe GmbH, CH) and 0.1 wt % of the sulfur stabilizer Lowinox DSTDP (Di-stearyl-thio-di-propionate, CAS No. 693-36-7, supplied by Chemtura Europe GmbH, CH).

5. Adhesion Promoter

The adhesion promoter (AP) is the maleic anhydride modified polypropylene homopolymer (PP-g-MAH) Exxelor PO1050 having an MFR2 (230° C.) of 430 g/10 min and a maleic anhydride content of 0.75 wt % supplied by ExxonMobil Chemical, USA.

6. Polymer Composition (PC)s

All polymer composition (PC)s as listed in table 1 (for inventive and comparative polymer composition (PC)s based on propylene-ethylene random copolymers and polypropylene homopolymers) were prepared by melt compounding in a Coperion ZSK 57 twin screw extruder (screw diameter 57 mm, L/D ratio 40) at temperatures between 190° C. and 240° C.

7. Cable Processing

The polymer compositions of table 1 were extruded as insulation layer onto a copper wire conductor having a diameter of 0.53 mm with a single screw extruder and a standard wire coating extrusion head with die dimensions, extruder pressures and speeds as indicated in table 2. The conductor was pre-heated to a temperature of 100° C., the melt temperature was set to 220° C. and a final cable diameter of 0.93 mm was adjusted in all cases. Cooling of the cable was performed first with water of 25° C. in a spray-cooling setup having a length of 2 m and then with water of 15° C. in an immersion-cooling setup.

TABLE 1a

Polymer compositions (n.a.—not applicable)

| | Polymer type | Nucleant | AP type | AP amount [wt.-%] | MFR 2.16 kg 190*/230° C. [g/10 min] |
|---|---|---|---|---|---|
| IE1 | XPP1 | pVCH | PP-g-MAH | 1.5 | 4.1 |
| IE2 | XPP1 | pVCH + NX8000 | PP-g-MAH | 1.5 | 4.2 |
| CE1 | XPP1 | pVCH | — | — | 3.9 |
| CE2 | DM55pharm | NX8000 | PP-g-MAH | 1.5 | 2.8 |
| CE3 | DM55pharm | — | — | — | 2.8 |
| CE4 | PP-R | NX8000 | PP-g-MAH | 1.5 | 2.0 |
| CE5 | HE4872 | — | EMAA | 0.85 | 0.9* |
| CE6 | HE3366 | — | — | — | 0.8* |

AP adhesion promoter

TABLE 1b

Polymer compositions (n.a.—not analyzed)

| | DSC 10K/min | | REact | | |
|---|---|---|---|---|---|
| | Tm [° C.] | Tc [° C.] | parameter — | C2 total [wt.-%] | Shore D — |
| IE1 | 160 | 124 | 6791 | 0.65 | 70 |
| IE2 | 161 | 127 | 6808 | 0.65 | 70 |
| CE1 | 160 | 124 | 6872 | 0.65 | 70 |

TABLE 1b-continued

Polymer compositions (n.a.—not analyzed)

| | DSC 10K/min | | REact | | |
|---|---|---|---|---|---|
| | Tm [° C.] | Tc [° C.] | parameter — | C2 total [wt.-%] | Shore D — |
| CE2 | 164 | 128 | 6169 | 0 | 71 |
| CE3 | 164 | 120 | 3963 | 0 | 70 |
| CE4 | 153 | 126 | 4806 | 2.0 | 67 |
| CE5 | 127 | 117 | n.a. | n.a. | 58 |
| CE6 | 127 | 116 | n.a. | n.a. | 58 |

TABLE 2

Processing and cable characteristics

| | Polymer type (base) | Die geometry body length/ diameter [mm] | Extruder pressure [bar] | Line speed [m/min] | Screw speed [rpm] | Surface quality (1-10) | Strip force [N] |
|---|---|---|---|---|---|---|---|
| IE1 | XPP1 | 30/1.00 | 255 | 977 | 57 | 10 | 10.4 |
| IE2 | XPP1 | 30/1.00 | 260 | 995 | 58 | 10 | 8.4 |
| CE1 | XPP1 | 30/1.00 | 270 | 994 | 58 | 9 | 7.0 |
| CE2 | DM55pharm | 30/1.00 | 317 | 1006 | 71 | 10 | 9.2 |
| CE3 | DM55pharm | 25/0.94 | 360 | 1100 | 96 | 7 | 6.2 |
| CE4 | PP-R | 25/0.94 | 323 | 1031 | 61 | 10 | 9.8 |
| CE5 | HE4872 | 25/0.94 | 460 | 1025 | 54 | 10 | 9.0 |
| CE6 | HE3366 | 25/0.94 | 460 | 1010 | 49 | 9 | 5.5 |

The invention claimed is:

1. A cable having a conductor and at least one insulation layer comprising a polymer composition (PC) comprising:
  (a) at least 98 wt. %, based on the total weight of the polymer composition (PC), of a crystalline polypropylene (PP) homo- or copolymer having a melt flow rate according to ISO 1133 (230° C./2.16 kg) in the range of 1.0 to 10.0 g/10 min, a ratio of the weight and number average molecular weight Mw/Mn as calculated from the molecular weight distribution determined by size exclusion chromatography according to ISO 160140 in the range of from 2.2 to 6.0, and a comonomer content of below 5.0 wt. %, wherein the comonomers are ethylene and/or a $C_4$ to $C_{10}$ α-olefin,
  (b) 0.5 up to 2.0 wt. %, based on the total weight of the polymer composition (PC), of an adhesion promoter (AP) being a maleic anhydride modified polypropylene homo- or copolymer and/or an acrylic acid modified polypropylene homo- or copolymer having a melt flow rate $MFR_2$ (230° C./2.16 kg) in the range of from 2 to 500 g/10 min,
  (c) 0.0001 to 1.0 wt. %, based on the total weight of the polymer composition (PC), of a polymeric α-nucleating agent (pNA), and
  (d) optionally 0.02 to 1.0 wt. %, based on the total weight of the polymer composition (PC), of a soluble α-nucleating agent (sNA),
  wherein the crystalline polypropylene (PP) homo- or copolymer, the maleic anhydride modified polypropylene homo- or copolymer and/or an acrylic acid modified polypropylene homo- or copolymer, and the polymeric α-nucleating agent (pNA) are the only polymer components in the polymer composition (PC).

2. The cable according to claim 1, wherein the polymer composition (PC)
(a) comprises only the polymeric α-nucleating agent (pNA) and the soluble α-nucleating agent (sNA) as α-nucleating agents; or
(b) comprises only the polymeric α-nucleating agent (pNA) as α-nucleating agent.

3. The cable according to claim 1, wherein the polymer composition (PC) and/or the crystalline polypropylene (PP) homo- or copolymer has/have a melting temperature Tm as determined by differential scanning calorimetry (DSC) in the range of 155° C. to 170° C.

4. The cable according to claim 1, wherein the polymer composition (PC) and/or the crystalline polypropylene (PP) homo- or copolymer has a crystallization temperature Tc as determined by differential scanning calorimetry (DSC) in the range of 118° C. to 131° C.

5. The cable according to claim 1, wherein the polymer composition (PC) has a Shore D hardness from 64 to 75.

6. The cable according to claim 1, wherein the polymer composition (PC) and/or the crystalline polypropylene (PP) homo- or copolymer has/have a content of a fraction soluble in xylene at 25° C. from 0.5 wt. % to 8.5 wt. %.

7. The cable according to claim 1, wherein the polymer composition (PC) has a melt flow rate according to ISO 1133 (230° C./2.16 kg) in the range of 1.0 and 8.0 g/10 min.

8. The cable according to claim 1, wherein the polymeric α-nucleating agent (pNA) is a polymerized vinyl compound of formula (IV):

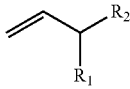

wherein $R_1$ and $R_2$ together form a 5 or 6 membered saturated or unsaturated or aromatic ring or they stand independently for a lower alkyl comprising 1 to 4 carbon atoms.

9. The cable according to claim 8, wherein the polymeric α-nucleating agent (pNA) is a polymerized vinyl compound selected from the group consisting of vinyl cycloalkanes.

10. The cable according to claim 1, wherein the soluble α-nucleating agent (sNA) is:
(a) selected from the group consisting of sorbitol derivatives, nonitol derivatives, benzene-trisamides and mixtures thereof, and/or
(b) present in the polymer composition (PC) in an amount between 0.1 wt. % and 0.8 wt. %, based on the total weight of the polymer composition (PC).

11. A process for producing a cable according to claim 1, wherein the process comprises the steps of:
(a) forming a polymer composition (PC) comprising:
(a1) at least 98.0 wt. %, based on the total weight of the polymer composition (PC), of a crystalline polypropylene (PP) homo- or copolymer having a melt flow rate according to ISO 1133 (230° C./2.16 kg) in the range of 1.0 to 10.0 g/10 min and a comonomer content of below 5.0 wt. %, the comonomers are ethylene and/or a $C_4$ to $C_{10}$ α-olefin,
(a2) 0.5 up to 2.0 wt. %, based on the total weight of the polymer composition (PC), of an adhesion promoter (AP) being a maleic anhydride modified polypropylene homo- or copolymer and/or an acrylic acid modified polypropylene homo- or copolymer having a melt flow rate $MFR_2$ in the range of from 2 to 500 g/10 min,
(a3) 0.0001 to 1.0 wt. %, based on the total weight of the polymer composition (PC), of a polymeric α-nucleating agent (pNA), and
(a4) optionally 0.02 to 1.0 wt. %, based on the total weight of the polymer composition (PC), of a soluble α-nucleating agent (sNA),
wherein the crystalline polypropylene (PP) homo- or copolymer, the maleic anhydride modified polypropylene homo- or copolymer and/or an acrylic acid modified polypropylene homo- or copolymer, and the polymeric α-nucleating agent (pNA) are the only polymer components in the polymer composition (PC),
(b) applying the polymer composition (PC) of step a) at a melt temperature of 180° C. to 280° C. on a conductor to form an insulation layer, and
(c) producing the cable at a processing speed of 300 m/min to 3000 m/min.

12. The process according to claim 11, wherein the conductor is pre-heated to a temperature of between 50° C. and 150° C.

13. The process of claim 11, wherein the polymeric α-nucleating agent (pNA) is a polymerized vinyl compound and the soluble α-nucleating agent (sNA) is selected from the group consisting of sorbitol derivatives, nonitol derivatives, benzene-trisamides and mixtures thereof.

14. The process according to claim 11, wherein the cable is a communication cable.

* * * * *